US012750926B2

(12) United States Patent
Kwack et al.

(10) Patent No.: US 12,750,926 B2
(45) Date of Patent: Sep. 29, 2026

(54) INDUCTION HEATING COOKTOP AND WIRELESS INDICATOR FOR INDICATING OPERATION STATE THEREOF

(71) Applicant: LG ELECTRONICS INC., Seoul (KR)

(72) Inventors: Younghwan Kwack, Seoul (KR); Seongho Son, Seoul (KR); Seonho Jeon, Seoul (KR); Chuhyoung Cho, Seoul (KR); Jongseong Ji, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 885 days.

(21) Appl. No.: 18/020,387

(22) PCT Filed: Dec. 15, 2020

(86) PCT No.: PCT/KR2020/018323

§ 371 (c)(1),
(2) Date: Feb. 8, 2023

(87) PCT Pub. No.: WO2022/059860

PCT Pub. Date: Mar. 24, 2022

(65) Prior Publication Data

US 2023/0292411 A1 Sep. 14, 2023

(30) Foreign Application Priority Data

Sep. 16, 2020 (KR) ........................ 10-2020-0119131

(51) Int. Cl.
*H05B 6/12* (2006.01)
*H02M 5/458* (2006.01)

(52) U.S. Cl.
CPC ......... *H05B 6/1218* (2013.01); *H05B 6/1236* (2013.01); *H02M 5/4585* (2013.01)

(58) Field of Classification Search
CPC ........ H05B 6/062; H05B 6/1218; H05B 6/36; H05B 2213/03; H05B 6/1236; H02M 5/4585

(Continued)

(56) References Cited

U.S. PATENT DOCUMENTS 6,828,530 B2 * 12/2004 Boegel ................ H05B 6/1218 362/555
2012/0132647 A1 * 5/2012 Beverly ................ H05B 6/062 219/620

(Continued)

FOREIGN PATENT DOCUMENTS

DE 195 46 853 A1 6/1997
JP 2001-326063 A 11/2001

(Continued)

OTHER PUBLICATIONS

International Search Report for PCT/KR2020/018323 mailed on Jun. 11, 2021.

*Primary Examiner* — Phuong T Nguyen
(74) *Attorney, Agent, or Firm* — Birch, Stewart, Kolasch & Birch, LLP

(57) ABSTRACT

The present disclosure includes an induction heating cooktop and a wireless indicator for indicating an operation state of the cooktop, the wireless indicator comprising: a closed loop coil; and a light-emitting device driven by a voltage which is induced in the closed loop coil through an induced magnetic field generated by a working coil of the cooktop.

7 Claims, 6 Drawing Sheets

(58) Field of Classification Search
USPC ................................ 219/506, 620, 665, 622
See application file for complete search history.

(56) References Cited

U.S. PATENT DOCUMENTS

| | | | | |
|---|---|---|---|---|
| 2018/0192479 | A1* | 7/2018 | Kwack ................ | H05B 6/1236 |
| 2019/0104573 | A1 | 4/2019 | Moon et al. | |
| 2020/0120761 | A1 | 4/2020 | Ok et al. | |
| 2020/0154532 | A1 | 5/2020 | Kim et al. | |

FOREIGN PATENT DOCUMENTS

| | | | |
|---|---|---|---|
| JP | 2014-186843 | A | 10/2014 |
| KR | 10-2011-0062959 | A | 6/2011 |
| KR | 10-2019-0038171 | A | 4/2019 |
| KR | 10-2020-0040529 | A | 4/2020 |
| KR | 10-2020-0053121 | A | 5/2020 |
| KR | 10-2020-0066529 | A | 6/2020 |

* cited by examiner

INDUCTION HEATING COOKTOP AND WIRELESS INDICATOR FOR INDICATING OPERATION STATE THEREOF

CROSS REFERENCE TO RELATED APPLICATIONS

This application is the National Phase of PCT International Application No. PCT/KR2020/018323, filed on Dec. 15, 2020, which claims priority under 35 U.S.C. 119(a) to Patent Application No. 10-2020-0119131, filed in the Republic of Korea on Sep. 16, 2020, all of which are hereby expressly incorporated by reference into the present application.

TECHNICAL FIELD

The present disclosure relates to an induction heating type cooktop and a wireless indicator indicating an operation state thereof.

BACKGROUND ART

Recently, the market size of electric ranges is gradually expanding. This is because an electric range does not generate carbon monoxide during a combustion process, and a risk of safety accidents such as gas leakage or fire is low.

The electric range includes a highlight method for converting electricity into heat using a nichrome wire having high electrical resistance, and an induction method for applying heat through an electromagnetic induction heating method by generating a magnetic field.

An induction heating type cooktop means an electric range operating using an induction method. A specific operation principle of the induction heating type cooktop is explained as follows.

In general, an induction heating type cooktop causes a high-frequency current to flow through a working coil or heating coil provided therein. When a high-frequency current flows through the working coil or the heating coil, strong lines of magnetic force are generated. Magnetic lines of force generated from the working coil or the heating coil form eddy currents when passing through a cooking vessel. Therefore, as the eddy current flows through the cooking container, heat is generated to heat the cooking container itself, and as the cooking container is heated, contents in the container are heated.

As described above, the induction heating type cooktop is an electric cooking device that heats the contents by inducing heat to the cooking container itself. When the induction heating type cooktop is used, oxygen is not consumed, and waste gas is not discharged, and thus indoor air pollution may be reduced. In addition, the induction heating type cooktop has high energy efficiency and stability, and a risk of burns is low because the container itself is heated.

Unlike a gas range, the induction heating type cooktop needs an indicator to indicate whether a cooktop is operating because there is no visibility as to whether the cooktop is in operation.

In a conventional induction heating type cooktop, an indicator is installed around a cooktop, and a circuit for driving and controlling the indicator is installed inside to externally indicate whether the cooktop is operating or not by driving the indicator. However, there is a problem in that an internal structure of the cooktop becomes complicated due to installation of the indicator and a circuit for controlling the indicator.

DISCLOSURE OF INVENTION

Technical Problem

An induction heating type cooktop according to an embodiment of the present disclosure provides an indicator that does not require separate power supply and a cooktop including the indicator.

The induction heating type cooktop according to an embodiment of the present disclosure provides a cooktop with a simplified internal structure through installation of a wireless indicator.

Technical Solution

The present disclosure includes an induction heating type cooktop and a wireless indicator indicating the operation state of the cooktop, and the wireless indicator includes a closed loop coil and a light emitting device driven by a voltage induced in the closed loop coil by an induced magnetic field generated from the closed loop coil of the cooktop.

Advantageous Effects

A wireless indicator of the present disclosure may not require separate power supply, and thus may not require a circuit configuration for power supply, thereby advantageously simplifying an internal structure of a cooktop including the wireless indicator.

When the wireless indicator of the present disclosure is disposed outside the working coil, an induced magnetic field that is not used for heating may be used, thereby advantageously increasing energy efficiency.

BEST MODE FOR CARRYING OUT THE INVENTION

Figure 1:
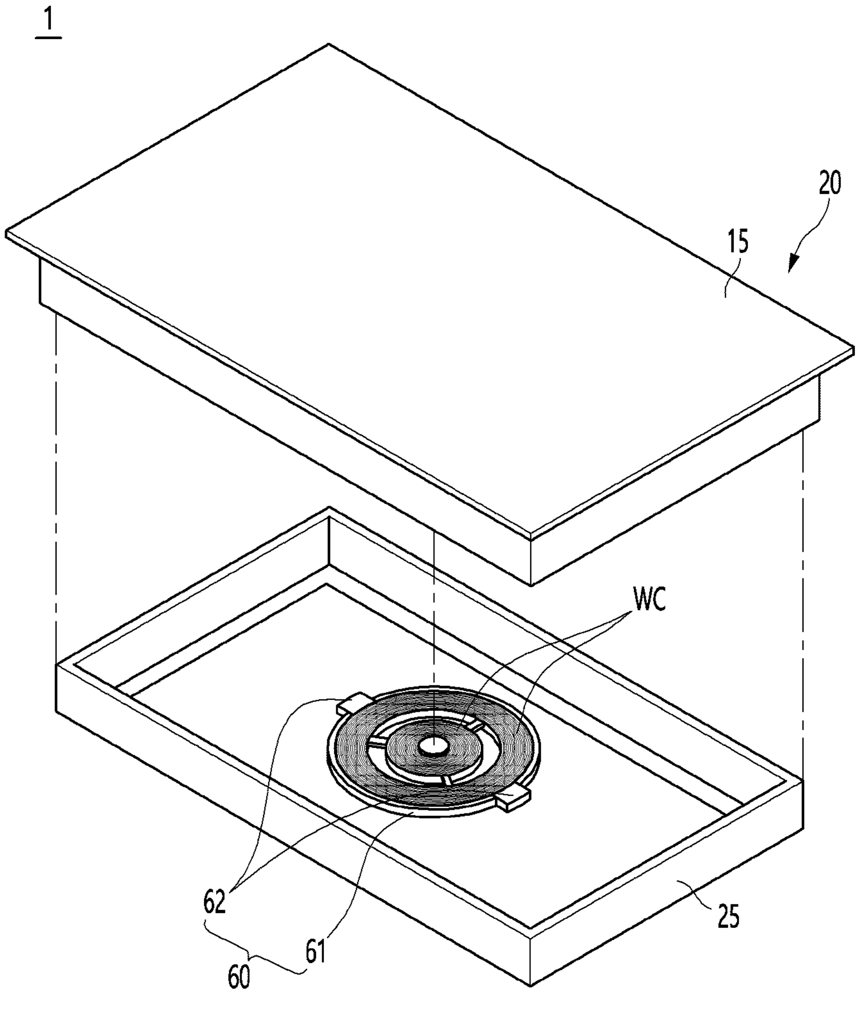
FIG. 1 is a diagram for explaining an induction heating type cooktop according to an embodiment of the present disclosure.

Hereinafter, exemplary embodiments of the present disclosure will be described in detail with reference to the accompanying drawings. In the drawings, the same reference numerals are used to indicate the same or similar components.

Hereinafter, an induction heating type cooktop according to an embodiment of the present disclosure will be described.

FIG. 1 is a diagram for explaining an induction heating type cooktop according to an embodiment of the present disclosure.

Figure 2:
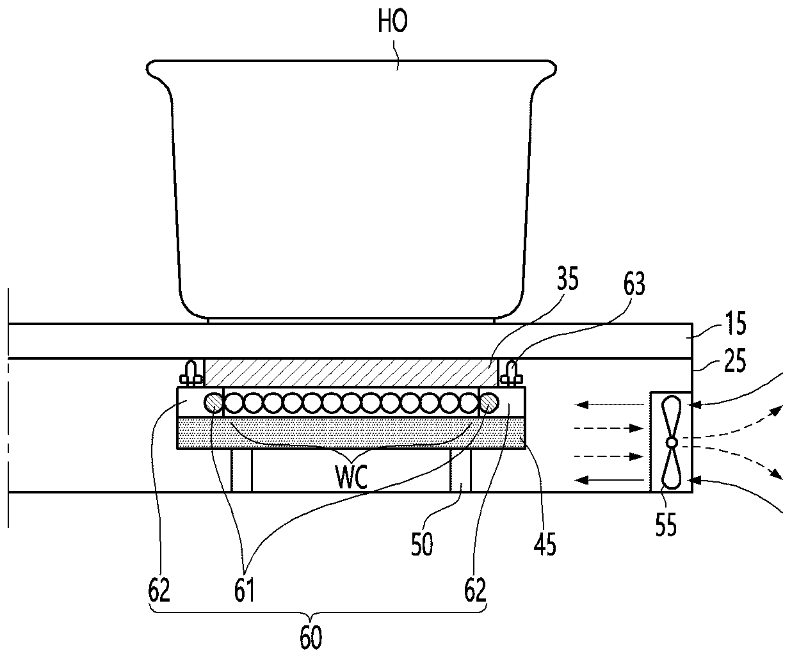
FIG. 2 is a cross-sectional diagram showing an induction heating type cooktop and a heated object according to an embodiment of the present disclosure.

FIG. 2 is a cross-sectional diagram showing an induction heating type cooktop and a heated object according to an embodiment of the present disclosure.

First, referring to FIG. 1, an induction heating type cooktop 1 according to an embodiment of the present disclosure may include a case 25, a cover plate 20, a working coil WC, and a wireless indicator 60.

The working coil WC and the wireless indicator 60 may be installed in the case 25. The working coil WC and the wireless indicator 60 may be disposed on the same plan.

For reference, in the case 25, various devices related to driving of the working coil (e.g., a power supply for providing AC power, a bridge diode and a capacitor for rectifying AC power of the power supply to DC power, an inverter for converting rectified DC power into resonance current through a switching operation and providing the resonance current to the working coil, a control module for controlling operations of various devices in the induction heating type cooktop 1, and a relay or a semiconductor switch for turning on or turning off the working coil) in addition to the working coil WC and the wireless indicator 60 may be installed, but a detailed description thereof will be described below.

The cover plate 20 may be coupled to an upper end of the case 25, and may include a top plate 15 having an upper surface on which a heated object (not shown) is disposed.

In detail, the cover plate 20 may include the top plate 15 for putting a heated object such as a cooking container thereon.

Here, the top plate 15 may be formed of, for example, a glass material (e.g., ceramics glass).

The top plate 15 may include an interface (not shown) for receiving an input from a user and transferring the corresponding input to a control module (not shown) for an input interface. Needless to say, the interface may be provided at a location other than the top plate 15.

For reference, the interface may be a module for inputting a heating intensity desired by a user or an operating time of the induction heating type cooktop 1, and the like, and may be implemented in various ways, such as a physical button or a touch panel. The interface may include, for example, a power button, a lock button, a power level control button (+, −), a timer control button (+, −), a charging mode button, and the like. The interface may transmit an input provided from the user to the control module for an input interface (not shown), and the control module for the input interface may transmit the input to the aforementioned control module (i.e., a control module for an inverter). In addition, the aforementioned control module may control an operation of various devices (e.g., working coils) based on the input (i.e., user input) provided from the control module for the input interface. Specific details thereof will be described below.

Hereinafter, a control module for an inverter in the present disclosure will be referred to as a processor 190.

Whether the working coil WC is driven and heating intensity (i.e., thermal power) may be visually displayed on the top plate 15. Whether the working coil WC is driven and heating intensity may be displayed by the wireless indicator 60 including a light emitting device 63 (e.g., an LED) provided in the case 25. The wireless indicator 60 may include a closed loop coil 61 forming a closed loop and the light emitting device 63. The closed loop coil 61 may be a coil wound more than 1-Turn. When the number of turns of the closed loop coil 61 increases, the magnitude of a voltage induced by the wireless indicator 60 may increase in proportion to the number of turns. The PCB board 62 may be connected to the closed loop coil 61, and the light emitting device 63 driven by the induced voltage of the closed loop coil 61 may be installed on the PCB board 62. The configuration and driving method of the wireless indicator 60 will be described later.

The working coil WC may be installed in the case 25 to heat a heated object.

In detail, driving of the working coil WC may be controlled by the aforementioned control module (not shown), and when the heated object is positioned on the top plate 15, the working coil may be driven by the control module.

The working coil WC may directly heat a heated object (i.e., magnetic material) that exhibits magnetism by an induction heating method.

For reference, FIG. 1 illustrates that one working coil WC is installed in the case 25, but is not limited thereto. That is, one or more working coils may be installed in the case 25, but for convenience of explanation, in the embodiment of the present disclosure, an example in which one working coil WC is installed in the case 25 will be described.

Although the indicator 60 is illustrated as including two PCB boards 62 and the light emitting device 63 in FIG. 1, the present disclosure is not limited thereto. That is, the indicator 60 may include one or more than three PCB boards 62 or light emitting devices 63, but for convenience of description, in the embodiment of the present disclosure, an example in which one indicator 60 includes two PCB boards 62 and two light emitting devices 63 will be described. According to a design change, the indicator 60 may include only the closed loop coil 61 and the light emitting device 63 without the PCB board 62.

Next, referring to FIG. 2, the induction heating type cooktop 1 according to an embodiment of the present disclosure may further include at least some or all of an insulator 35, a shielding plate 45, a support member 50, a cooling fan 55, and the wireless indicator 60

The insulator 35 may be disposed between the top plate 15 and the working coil WC.

In detail, the insulator 35 may be mounted below the top plate 15, and the working coil WC may be disposed below the insulator 35.

The insulator 35 may block heat generated while a heated object HO is heated by driving the working coil WC from being transferred to the working coil WC.

That is, when the heated object HO is heated by electromagnetic induction of the working coil WC, heat of the heated object HO may be transferred to the top plate 15, and heat of the top plate 15 may be again transferred to the working coil WC and the working coil WC may be damaged.

In this way, the insulator 35 may block heat transmitted to the working coil WC, thereby preventing the working coil WC from being damaged by heat, and further preventing heating performance of the working coil WC from deteriorating.

For reference, although not an essential component, a spacer (not shown) may be installed between the working coil WC and the insulator 35.

In detail, a spacer (not shown) may be inserted between the working coil WC and the insulator 35 to prevent direct contact between the working coil WC and the insulator 35. Accordingly, the spacer (not shown) may block heat generated while the heated object HO is heated by driving the working coil WC from being transferred to the working coil WC through the insulator 35.

That is, a spacer (not shown) may partially share the role of the insulator 35, and the thickness of the insulator 35 may be minimized, through which a distance between the heated object HO and the working coil WC may be minimized.

In addition, a plurality of spacers (not shown) may be provided, and the plurality of spacers may be disposed to be spaced apart from each other between the working coil WC and the insulator 35. Accordingly, air sucked into the case 25 by the cooling fan 55 described later may be guided to the working coil WC by the spacer.

That is, the spacer may improve the cooling efficiency of the working coil WC by guiding air introduced into the case 25 by the cooling fan 55 to be properly transferred to the working coil WC.

The shielding plate 45 may be mounted on a lower surface of the working coil WC to block a magnetic field generated downward when the working coil WC is driven.

In detail, the shielding plate 45 may block a magnetic field generated downward when the working coil WC is driven, and may be supported upward by the support member 50.

The support member 50 may be installed between a lower surface of the shielding plate 45 and a lower plate of the case 25 to support the shielding plate 45 upward.

In detail, the support member 50 may indirectly support the insulator 35 and the working coil WC upward by supporting the shielding plate 45 upward, and through this, the insulator 35 may be brought into close contact with the top plate 15.

As a result, it may be possible to maintain a constant distance between the working coil WC and the heated object HO.

For reference, the support member 50 may include, for example, an elastic body (e.g., a spring) for supporting the shielding plate 45 upward, but is not limited thereto. Also, since the support member 50 is not an essential component, the support member 50 may be omitted from the induction heating type cooktop 1.

The cooling fan 55 may be installed in the case 25 to cool the working coil WC.

In detail, driving of the cooling fan 55 may be controlled by the aforementioned control module, and may be installed on a sidewall of the case 25. Needless to say, the cooling fan 55 may be installed at a location other than the sidewall of the case 25, but in the embodiment of the present disclosure, for convenience of explanation, an example in which the cooling fan 55 is installed on the sidewall of the case 25 will be described.

As shown in FIG. 2, the cooling fan 55 may suck air outside the case 25 and may transfer the air to the working coil WC or may suck air (in particular, hot air) inside the case 25 to cool the case 25 and may discharge the air to the outside of the case 25.

Through this, components inside the case 25 (in particular, the working coil WC) may be efficiently cooled.

As described above, air outside the case 25 transferred to the working coil WC by the cooling fan 55 may be guided to the working coil WC by the spacer. Accordingly, the working coil WC may be directly and efficiently cooled, and thus it may be possible to improve durability of the working coil WC (i.e., improve durability by preventing heat damage).

The closed loop coil 61 forming a closed loop of the wireless indicator 60 may be positioned around the working coil WC in a form surrounding an outer circumference of the working coil WC. The light emitting device 63 (e.g., an LED) installed on the PCB board 62 of the wireless indicator 60 may be disposed next to the insulator 35 to increase visibility, but this is only an example.

A rectifying element or a capacitor in addition to the light emitting device 63 may be further installed on the PCB board 62.

In addition, although not shown in the drawings, the induction heating type cooktop 1 of the present disclosure may further include a temperature sensor. The temperature sensor may be provided inside or outside the induction heating type cooktop 1 to detect the temperature of the top plate 15.

Hereinafter, with reference to FIG. 3, the arrangement of the wireless indicator in the cooktop of the present disclosure will be described.

Figure 3:
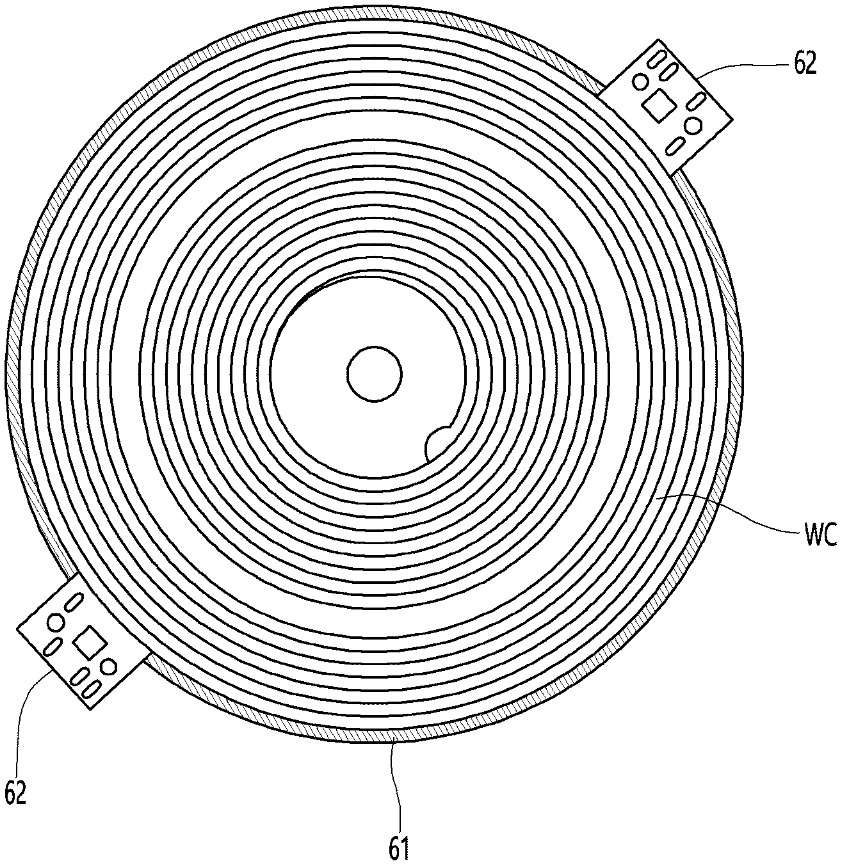
FIG. 3 is a diagram from above of a working coil and a wireless indicator to explain arrangement of a wireless indicator in a cooktop of the present disclosure.

FIG. 3 is a diagram from above of a working coil and a wireless indicator to explain arrangement of a wireless indicator in a cooktop of the present disclosure.

The wireless indicator 60 may be disposed adjacent to a periphery of the working coil WC around the working coil WC. For example, the closed loop coil 61 of the wireless indicator 60 may have a larger diameter than an outer coil constituting the working coil WC, and may be disposed adjacent to the outer coil of the working coil WC.

Accordingly, the voltage induced by the closed loop coil 61 of the wireless indicator 60 may be a voltage induced by an induced magnetic field generated by the working coil WC when the working coil WC is driven.

In some embodiments, when the PCB board 62 is configured as one piece, the PCB board 62 may be disposed at one point of the closed loop coil 61 formed in a circular shape.

In some embodiments, when the PCB board 62 is configured as two pieces, the first PCB board 62 may be disposed at one point of the closed loop coil 61 formed in a circular shape, and a second PCB board 62 may be disposed at another point of the closed loop coil 61 at which a straight line passing through the first PCB board 62 and the closed loop coil 61 meet. As described above, each of the PCB board 62 and the light emitting device 63 is shown as two, but since this is only an example, the PCB board 62 and the light emitting device 63 may be configured as one or more.

The wireless indicator 60 of the present disclosure may be disposed outside the working coil WC, and among the induced magnetic fields generated in the working coil WC, a magnetic field not used for heating the heated object HO may be induced in the closed loop coil 61. Therefore, the wireless indicator 60 of the present disclosure may advantageously increase energy efficiency by utilizing an induced magnetic field not used for heating.

Figure 4:
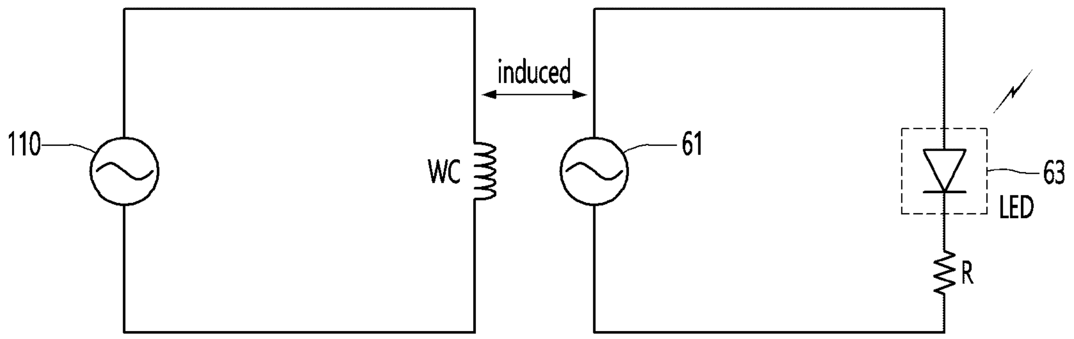
FIG. 4 is a diagram showing an example of a simple circuit diagram of an induction heating type cooktop and a wireless indicator according to the present disclosure.

FIG. 4 is a diagram showing an example of a simple circuit diagram of an induction heating type cooktop and a wireless indicator according to the present disclosure.

The working coil WC of the induction heating type cooktop 1 of the present disclosure may generate an induced magnetic field based on power supplied from a power supply 110, and the generated induced magnetic field may be induced in closed loop coil 61 of the wireless indicator 60. Accordingly, the closed loop coil 61 of the wireless indicator 60 of the present disclosure may serve as a power source for the light emitting device 63. Operation methods of the induction heating type cooktop 1 and the wireless indicator 60 will be described later in detail.

Hereinafter, with reference to FIG. 5, an operation of an induction heating type cooktop of the present disclosure will be described.

Figure 5:
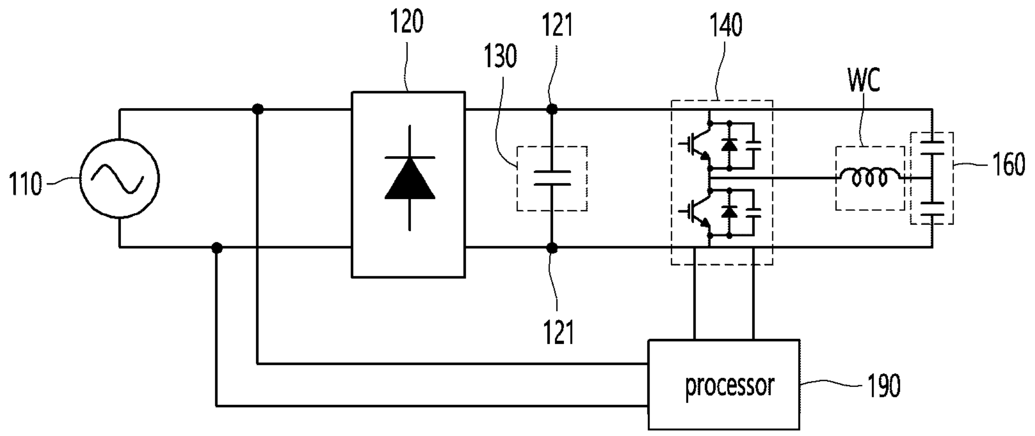
FIG. 5 is an exemplary diagram showing a circuit diagram of an induction heating type cooktop according to the present disclosure.

FIG. 5 is an exemplary diagram showing a circuit diagram of an induction heating type cooktop according to the present disclosure. In detail, FIG. 5 is a circuit diagram of an induction heating type cooktop when the induction heating type cooktop includes one inverter and one working coil.

Referring to FIG. 5, the induction heating type cooktop 1 may include the power supply 110, a rectifier 120, a DC link capacitor 130, an inverter 140, the working coil WC, a resonance capacitor 160, and the processor 190.

The power supply 110 may be alternating current (AC) input power. The power supply 110 may supply AC power to an induction heating type cooktop. In more detail, the power supply 110 may supply an AC voltage to the rectifier 120 of the induction heating type cooktop.

The rectifier 120 may be an electrical device for converting alternating current to direct current.

The rectifier 120 may convert the AC voltage supplied through an external power source 110 into a DC voltage.

Both DC ends 121 that are output through the rectifier 120 are referred to as a DC link. A voltage measured across the both DC ends 121 is referred to as a DC link voltage.

The DC link capacitor 130 may function as a buffer between the external power source 110 and the inverter 140. In detail, the DC link capacitor 130 may be used to maintain the DC link voltage converted through the rectifier 120 to supply the DC link voltage up to the inverter 140.

The inverter 140 may serve to switch a voltage applied to the working coil WC to cause a high-frequency current to flow through the working coil WC. The inverter 140 may cause a high-frequency current to flow through the working coil WC by driving a switching element generally made of an Insulated Gate Bipolar Transistor (IGBT), and thus a high-frequency magnetic field may be formed in the working coil WC. In this specification, the IGBT is taken as an example as the switching element constituting the inverter 140, but this is only an example.

The processor 190 may transmit a driving signal to the inverter 140. A high-frequency voltage may be applied to the working coil WC while the switching element of the inverter 140 alternately operates according to the driving signal transmitted from the processor 190.

The processor 190 may control the inverter 140 according to a user command to generate thermal power at a level desired by a user. The processor 190 may lower a resonance frequency of the inverter 140 as the target thermal power level increases, and increase the resonance frequency of the inverter 140 as the target thermal power level decreases.

The processor 190 may sense the temperature of the top plate 15 of the induction heating type cooktop 1 through a temperature sensor provided inside or outside the induction heating type cooktop 1. The processor 190 may control the inverter 140 according to the detected temperature of the top plate 15, but this will be described later.

In the working coil WC, current may flow or current may not flow depending on whether the switching element is driven. When current flows through the working coil WC, a magnetic field is generated. The working coil WC may heat the heated object HO by generating a magnetic field as current flows.

Figure 6:
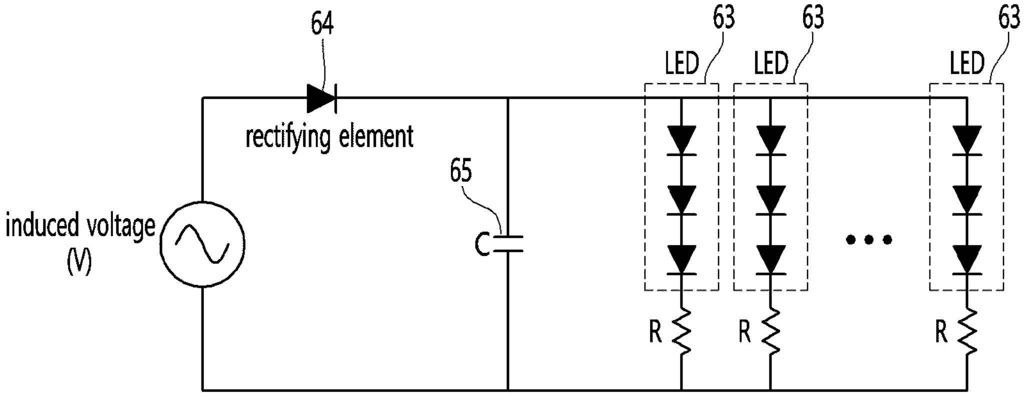
FIG. 6 is an exemplary diagram showing a circuit diagram of a wireless indicator according to the present disclosure.

FIG. 6 is an exemplary diagram showing a circuit diagram of a wireless indicator according to the present disclosure.

The wireless indicator 60 may further include a rectifying element 64 and a capacitor 65 in addition to the closed loop coil 61 forming a closed loop and the light emitting device 63 driven by a voltage induced in the closed loop coil 61.

An induced voltage V may refer to a voltage induced in the closed loop coil 61 by a magnetic field generated in the working coil WC.

The light emitting device 63 may be a device that converts electrical energy into light energy, such as a light emitting diode (LED). The light emitting device 63 may emit light when current is supplied by the induced voltage V induced in the closed loop coil 61. The brightness of the light emitting device 63 may be proportional to the magnitude of the induced voltage V.

The rectifying element 64 may be an element for making a direction of current flowing through the wireless indicator 60 flow in one direction.

The capacitor 65 may be an element that stores the induced voltage V. The capacitor 65 may display residual heat of the cooktop 1 by storing the induced voltage V. In some embodiments, when the capacity of the capacitor 65 is changed, a residual heat display time may be changed. For example, as the capacity of the capacitor 65 increases, the amount of the induced voltage V to be stored increases, and thus even if a time during which no current flows to the working coil WC increases, a time during which the light emitting device 63 emits light may increase.

Next, with reference to FIG. 7, a relationship between the intensity of resonant current flowing through the working coil WC and a voltage induced in the wireless indicator 60 will be explained.

Figure 7:
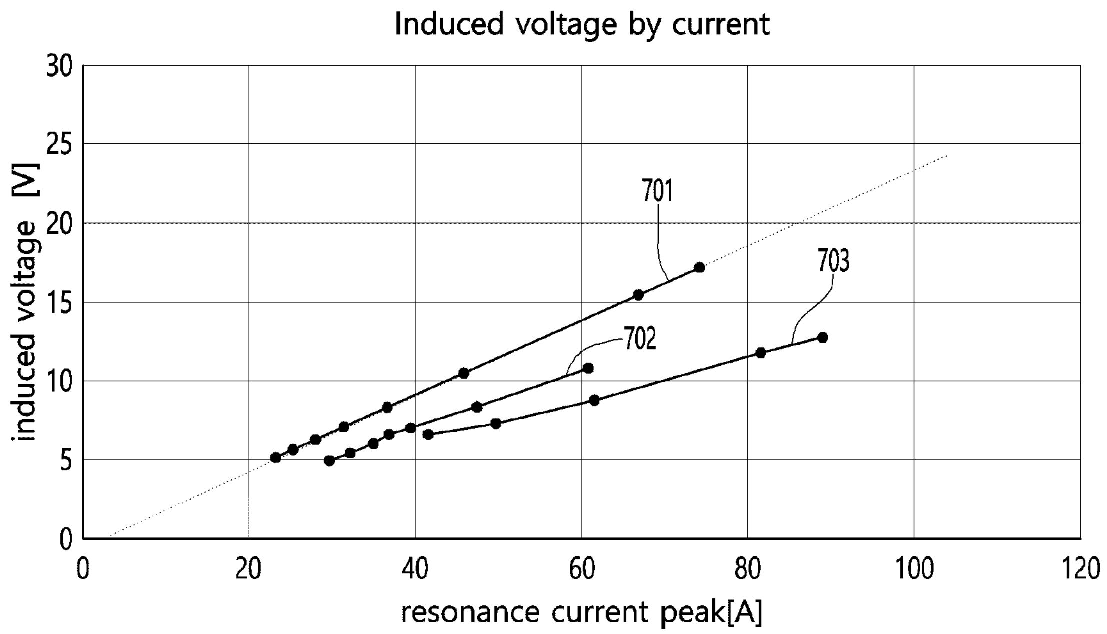
FIG. 7 is a graph showing an induced voltage of a wireless indicator depending on the intensity of current flowing in a working coil.

FIG. 7 is a graph showing an induced voltage of a wireless indicator depending on the intensity of current flowing in a working coil.

In FIG. 7, the x-axis means the intensity of resonance current flowing through the working coil WC, and the y-axis means the magnitude of a voltage induced in the wireless indicator 60.

A first line 701 is a line showing a relationship between resonance current flowing through the working coil WC and a voltage induced in the wireless indicator 60 when the heated object HO is not placed on the top plate 15.

A second line 702 is a line showing a relationship between resonance current flowing through the working coil WC and a voltage induced in the wireless indicator 60 when a first heated object HO, which responds to an induced magnetic field generated by the working coil WC, is placed on the top plate 15.

A third line 703 is a line showing a relationship between resonance current flowing through the working coil WC and a voltage induced in the wireless indicator 60 when a second heated object HO, which responds more than the first heated object HO that responds to the induced magnetic field generated by the working coil WC, is placed on the top plate 15.

Although slopes of the first line 701, the second line 702, and the third line 703 are different, as seen from the graph, as the intensity of the resonance current flowing through the working coil WC increases, the magnitude of the voltage induced in the wireless indicator 60 is also increased.

Accordingly, when the intensity of the resonance current flowing through the working coil WC increases (that is, when the intensity of thermal power increases), the voltage induced in the wireless indicator 60 also increases. As described above, since the brightness of the light emitting device 63 is proportional to the magnitude of the induced voltage, the brightness of the light emitting device 63 is proportional to the heating intensity of the induction heating type cooktop 1.

Through this, since a user is capable of knowing the intensity of thermal power through the brightness of the indicator, there may be an advantage in that the wireless indicator 60 or the induction heating type cooktop 1 including the wireless indicator 60 of the present disclosure directly indicates the intensity of thermal power.

In the induction heating type cooktop 1 according to an embodiment of the present disclosure, even when heating of the heated object HO through the working coil WC is completed, the temperature of the top plate 15 is also elevated by heating the heated object HO. That is, in the induction heating type cooktop 1 of the present disclosure, residual heat may remain in the top plate 15 even after heating is completed.

Next, with reference to FIG. 8, a control method for displaying residual heat of the induction heating type cooktop 1 will be explained.

Figure 8:
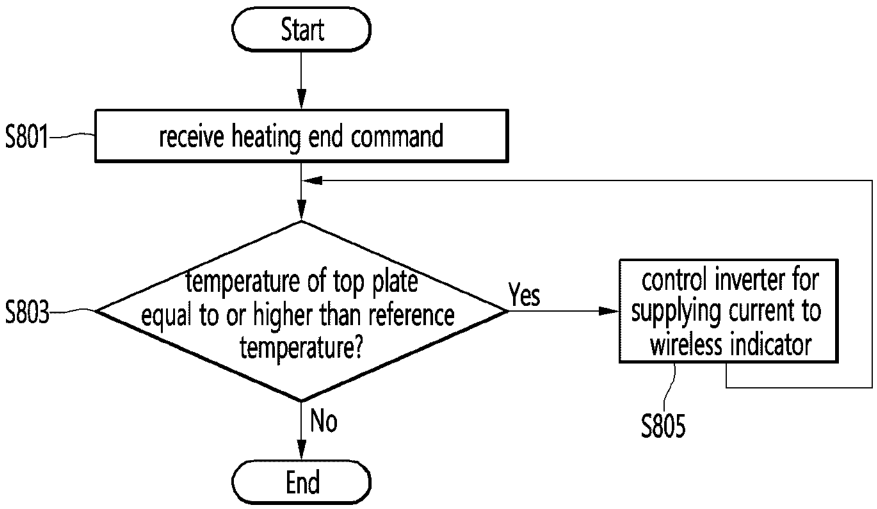
FIG. 8 is a flowchart showing a control method for displaying residual heat of an induction heating type cooktop according to the present disclosure.

FIG. 8 is a flowchart showing a control method for displaying residual heat of an induction heating type cooktop according to the present disclosure.

In FIG. 8, only a control method for displaying residual heat through the wireless indicator 60 after heating is completed will be described.

The processor 190 may receive a heating end command while heating the heated object HO according to a set heating mode (S801). The processor 190 may receive the heating end command through an interface (not shown).

When receiving the heating end command, the processor 190 may transmit a driving signal to the inverter 140 to cause the inverter 140 to stop an alternately repeated switching operation. For example, upon receiving a heating end command, the processor 190 may transmit an off signal to a switching element of the inverter 140 and thus current may not flow through the working coil WC.

The processor 190 may determine whether the temperature of the top plate 15 is equal to or higher than a reference temperature (S803). After heating is completed, the processor 190 may determine whether the temperature of the top plate 15 is equal to or higher than the reference temperature. The reference temperature may be a default value set in a device or a value set by a user.

When the detected temperature of the top plate 15 is equal to or higher than the reference temperature, the processor 190 may control the inverter 140 to supply power to the wireless indicator 60 (S805). The processor 190 may control the inverter 140 to supply current to the wireless indicator 60 at predetermined intervals while the temperature of the top plate 15 is equal to or higher than the reference temperature. For example, when the reference temperature is 90° C. and the predetermined interval is 3 seconds, the processor 190 may control the inverter 140 to operate for 3 seconds and not operate for 3 seconds while the temperature of the top plate 15 is equal to or higher than 90° C.

Since current flows through the wireless indicator 60 only when the processor 190 operates the inverter 140, the light emitting device 63 may emit light only while the inverter 140 operates. When the processor 190 repeats this operation, the light emitting device 63 may blink light.

The processor 190 may repeatedly perform an operation of controlling the inverter 140 for several seconds only until the temperature of the top plate 15 is less than the reference temperature. When the processor 190 repeats the above-described operation, the light emitting device of the wireless indicator 60 may repeat an operation of generating light for several seconds.

According to an embodiment, when the temperature of the processor 190 is equal to or higher than 90° C., the processor 190 may control the inverter 140 to cause the light emitting device 63 to emit light once every 3 seconds, and when the temperature of the top plate 15 is equal to or higher than 50° C. and is less than 90° C., the processor 190 may control the inverter 140 to cause the light emitting device 63 to emit light once every 5 seconds.

According to the aforementioned embodiment, the induction heating type cooktop 1 according to the present disclosure may advantageously notify a user that the temperature of the top plate 15 is high.

The above description is merely illustrative of the technical spirit of the present disclosure, and various modifications and variations may be made to those skilled in the art without departing from the essential characteristics of the present disclosure.

Therefore, the embodiments disclosed in the present disclosure are not intended to limit the technical spirit of the present disclosure, but to explain, and the scope of the technical spirit of the present disclosure is not limited by these embodiments.

The scope of the present disclosure needs to be interpreted by the following claims, and all technical ideas within the scope equivalent thereto needs to be construed as being included in the scope of the present disclosure.

The invention claimed is:

1. An induction heating type cooktop comprising:
- a power supply configured to supply alternating current (AC) voltage;
- a rectifier configured to convert the supplied AC voltage into a direct current (DC) voltage;
- a working coil configured to generate an induced magnetic field when current flows;
- an inverter configured to supply current to the working coil based on the converted DC voltage;
- a processor configured to control the inverter; and
- a wireless indicator indicating an operation state of the cooktop,
- wherein the wireless indicator includes:
- a closed loop coil; and
- a light emitting device driven by a voltage induced in the closed loop coil by the induced magnetic field generated in the cooktop,
- wherein, upon receiving a heating end command, the processor is configured to determine whether a temperature of a top plate of the cooktop is greater than or equal to a reference temperature, and control the inverter to supply current to the working coil such that the wireless indicator is driven while the temperature of the top plate is greater than or equal to the reference temperature.

2. The cooktop of claim 1, wherein the closed loop coil is disposed outside a working coil around the working coil of the cooktop.

3. The cooktop of claim 2, wherein the closed loop coil is disposed on the same plane as the working coil.

4. The cooktop of claim 2, wherein the wireless indicator includes a plurality of light emitting devices.

5. The cooktop of claim 2, wherein a brightness of the light emitting device is proportional to a magnitude of the voltage induced in the closed loop coil.

6. The cooktop of claim 1, wherein the wireless indicator further includes a capacitor configured to store the voltage induced in the closed loop coil; and wherein the light emitting device operates by the voltage induced in the closed loop coil or the voltage stored in the capacitor.

7. The cooktop of claim 1, wherein the processor supplies current to the wireless indicator at predetermined intervals by controlling the inverter while the top plate temperature is higher than or equal to the reference temperature.

* * * * *